US007010882B2

(12) United States Patent
Rich et al.

(10) Patent No.: US 7,010,882 B2
(45) Date of Patent: *Mar. 14, 2006

(54) CPU-CONTROLLED, REARMING, HIGH VOLTAGE OUTPUT CIRCUIT FOR ELECTRONIC ANIMAL TRAP

(75) Inventors: Christopher T. Rich, Leola, PA (US); Larry L Harman, Abbottstown, PA (US); David L. Anderson, Lititz, PA (US); Michael J. Gehret, Lititz, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,382

(22) Filed: Nov. 17, 2004

(65) Prior Publication Data

US 2005/0144830 A1    Jul. 7, 2005

Related U.S. Application Data

(63) Continuation of application No. 10/687,829, filed on Oct. 20, 2003, now Pat. No. 6,836,999.

(60) Provisional application No. 60/467,595, filed on May 5, 2003.

(51) Int. Cl.
*A01M 23/38*    (2006.01)

(52) U.S. Cl. ......................................................... 43/98
(58) Field of Classification Search ................... 43/98, 43/99, 58–76, 112
See application file for complete search history.

(56) References Cited

U.S. PATENT DOCUMENTS

| | | | | |
|---|---|---|---|---|
| 912,203 A | * | 2/1909 | Swasey | 43/98 |
| 1,029,551 A | * | 6/1912 | Molnar | 43/99 |
| 1,044,490 A | * | 11/1912 | Cessna | 43/99 |
| 1,074,770 A | * | 10/1913 | Beardsley | 43/99 |
| 1,660,013 A | * | 2/1928 | Morawiecki | 43/99 |
| 2,056,882 A | * | 10/1936 | Appiani | 43/73 |
| 3,468,054 A | * | 9/1969 | Levine | 43/98 |
| 3,750,158 A | * | 7/1973 | Anastassakis | 43/59 |
| 3,815,278 A | | 6/1974 | Beaton et al. | 43/99 |
| 3,827,176 A | * | 8/1974 | Stirewalt | 43/98 |
| 4,179,839 A | * | 12/1979 | Salotti et al. | 43/98 |
| 4,205,480 A | * | 6/1980 | Gartner | 43/98 |
| 4,250,655 A | * | 2/1981 | Munns | 43/99 |
| 4,497,130 A | * | 2/1985 | Fitzgerald | 43/98 |
| 4,566,218 A | * | 1/1986 | Kurosawa et al. | 43/99 |
| 4,653,221 A | * | 3/1987 | Pratscher | 43/64 |
| 4,709,502 A | * | 12/1987 | Bierman | 43/112 |
| 4,741,121 A | * | 5/1988 | Pratscher et al. | 43/58 |
| 4,780,985 A | * | 11/1988 | Coots | 43/98 |
| 4,862,145 A | * | 8/1989 | Meehan et al. | 340/573.2 |

(Continued)

FOREIGN PATENT DOCUMENTS

DE    814 348 C    9/1951

(Continued)

*Primary Examiner*—Darren W. Ark
(74) *Attorney, Agent, or Firm*—Jacobson Holman PLLC

(57) ABSTRACT

An electronic animal trap with a CPU-controlled, rearming, high voltage output circuit for trapping and exterminating pests. The high-voltage output circuit is connected to a pair of killing plates which are activated with a high-voltage pulse train for a period of time constituting a killing cycle when a known impedance is sensed across the plates. If, upon conclusion of the killing cycle, the impedance remains across the plates, the circuit activates a visual indicator to alert a user that the trap contains a dead mouse. However, if the impedance increases to that of an open circuit, likely meaning the animal has escaped, the circuit automatically rearms itself and no visual indicator is initiated.

11 Claims, 7 Drawing Sheets

U.S. PATENT DOCUMENTS

| | | | | |
|---|---|---|---|---|
| 4,890,415 | A * | 1/1990 | Fressola et al. | 43/61 |
| 4,949,500 | A * | 8/1990 | Jefferys | 43/98 |
| 5,027,547 | A * | 7/1991 | Livshin | 43/98 |
| 5,040,326 | A * | 8/1991 | Van Dijnsen et al. | 43/58 |
| 5,184,416 | A * | 2/1993 | Brewer | 43/98 |
| 5,185,953 | A * | 2/1993 | Gross | 43/58 |
| 5,224,287 | A * | 7/1993 | Knudsen | 43/81 |
| 5,269,091 | A * | 12/1993 | Johnson et al. | 43/98 |
| 5,477,635 | A * | 12/1995 | Orsano | 43/98 |
| 5,918,409 | A * | 7/1999 | Carnwath | 43/99 |
| 5,949,636 | A * | 9/1999 | Johnson et al. | 43/98 |
| 5,953,853 | A * | 9/1999 | Kim | 43/98 |
| 6,088,948 | A * | 7/2000 | R.o slashed.nnau | 43/72 |
| 6,137,415 | A * | 10/2000 | Rast | 43/98 |
| 6,195,932 | B1 * | 3/2001 | Aicher | 43/112 |
| 6,445,301 | B1 * | 9/2002 | Farrell et al. | 43/58 |
| 6,609,328 | B1 * | 8/2003 | Swift et al. | 43/98 |
| 6,622,422 | B1 * | 9/2003 | Gehret et al. | 43/61 |
| 6,735,899 | B1 * | 5/2004 | Anderson et al. | 43/98 |
| 6,775,947 | B1 * | 8/2004 | Anderson et al. | 43/98 |
| 6,796,081 | B1 * | 9/2004 | Anderson et al. | 43/98 |
| 6,836,999 | B1 * | 1/2005 | Rich et al. | 43/98 |
| 2003/0213161 | A1 * | 11/2003 | Gardner et al. | 43/61 |
| 2004/0025410 | A1 * | 2/2004 | Shapland | 43/65 |

FOREIGN PATENT DOCUMENTS

| | | | |
|---|---|---|---|
| DE | 814348 | C * | 9/1951 |
| DE | 3301057 | A1 * | 7/1984 |
| EP | 990389 | A1 * | 4/2000 |
| EP | 1400172 | A1 * | 3/2004 |
| FR | 2689371 | A1 * | 10/1993 |
| FR | 2714793 | A1 * | 7/1995 |
| FR | 2750294 | A1 * | 1/1998 |
| FR | 2758435 | A1 * | 7/1998 |
| FR | 2782601 | A1 * | 3/2000 |
| GB | 594 894 | A | 11/1947 |
| GB | 594894 | A * | 11/1947 |
| GB | 2107164 | A * | 4/1983 |
| GB | 2107164 | A1 * | 4/1983 |
| GB | 2354693 | A * | 4/2001 |
| GB | 2354693 | A1 * | 4/2001 |
| JP | 8-182456 | A * | 7/1996 |
| JP | 8-182456 | B1 * | 7/1996 |
| JP | 2001-231429 | A * | 8/2001 |
| JP | 2001-231429 | B1 * | 8/2001 |
| JP | 2002-160 | A * | 1/2002 |
| JP | 2002-160 | B1 * | 1/2002 |
| NZ | 250372 | A * | 10/1998 |
| WO | WO-97/01262 | A1 * | 1/1997 |
| WO | WO-99/15008 | A1 * | 4/1999 |
| WO | WO-99/18780 | A1 * | 4/1999 |

* cited by examiner

CPU-CONTROLLED, REARMING, HIGH VOLTAGE OUTPUT CIRCUIT FOR ELECTRONIC ANIMAL TRAP

This application is a continuation application of patent application, U.S. Ser. No. 10/687,829 filed Oct. 20, 2003, now U.S. Pat. No. 6,836,999, which claims the benefit of 60/467,595, filed May 5, 2003, and is entitled to and hereby claims the priority thereof.

BACKGROUND OF THE INVENTION

1. Field of the Invention

The invention relates to electric or electronic animal traps, and relates more particularly to an animal trap adapted to catch and electrocute a targeted animal, and also to rearm in the event the continuing presence of the animal is not detected upon completion of a killing cycle.

2. The Prior Art

Incline plane animal traps have been available for over one hundred years. The commercial embodiments of such traps currently available commonly comprise a housing defining an enlarged enclosure with one, or perhaps two, inclined plane trap assemblies communicating the interior of the enclosure with the exterior of the housing via an elongated passageway. An inclined plane tilting floor member is positioned in the passageway of each trap assembly and is adapted to lift a door to block the entrance opening when the animal passes beyond a pivot point, thereby limiting escape from the enclosure. When the animal exits the passageway into the enclosure, the door falls by gravity on the entrance end of the tilting floor to reset the trap and the raised end of the tilting floor limits the ability of the captured animal to return to the passageway. Such a trap is representatively described in co-pending application Ser. No. 09/729,832, filed Dec. 6, 2000 (the '832 application), which is incorporated herein by reference in its entirety.

Captured animals will attempt to escape in any way possible. When rodents are caught in the enclosure, they often try to grasp the inner end of the tilting floor to regain access to the passageway. In some instances, rodents on the tilting floor have been able to grasp the side of top edges of the door with their claws or teeth to pull the door down against their own weight, and thereby escape from the trap.

In order to prevent escape when live capture of the animal is not desired or needed, as in the case of vermin, animal traps have been developed which include electric or electronic components to kill the trapped animal. Many of these traps, however, have very complicated structures which are costly to manufacture. Additionally, these traps are not conveniently employed without disruption of the animal's environment nor are they able to control the voltage to the trap. Some are designed to provide continuous power which is not cost effective, and others cannot keep the animal in the trap, because the animal can grasp the top of a side edge of the trap door and scratch or chew its way out.

In U.S. Pat. No. 5,269,091 to Johnson et al, a flexible plate is charged with a base plate. Upon entry into the trap, the pest presses the flexible plate into contact with the base plate, completing the circuit and applying a high voltage to the pest. The problem with this type of device is that voltage is applied only when the pest makes contact with the flexible plate. In many cases, when the pest is initially shocked it will move and not receive enough of a shock to exterminate it. As there is no trap door, the pest can readily escape, thus defeating the purpose of the trap.

In an attempt to solve the previously noted electrical problem, U.S. Pat. No. 5,949,636 to Johnson et al discloses a portable pest electrocution device with a resistive switch trigger. The device has a resistive switch to sense the presence of a pest between two electrodes. One of the electrodes is set at a high voltage and the other is set to ground. The ground electrode is a separate stake-shaped electrode which is placed physically in the ground. When the pest enters the trap, contact is made, and a timer begins for a set period of time. After timing out, the timer deactivates the power to the electrodes. A problem with this device is that a separate ground stake is necessary which, if forgotten or misplaced, renders the device inoperative.

The trap of copending application, Ser. No. 10/043,161, filed Jan. 14, 2002 (the '161 application), which is hereby incorporated by reference in its entirety, has been designed to overcome the defects in the prior art and provides a virtually escape-proof animal trap with many advantages. Not only is the animal electrocuted effectively, but the device set forth in the '161 application also provides a visual indicator signaling when the trap has initiated a kill cycle and thereafter requires servicing to remove an electrocuted animal.

Other trap designs that have effectively overcome the pest-escape defects in the prior art are set forth in copending application, Ser. No. 10/320,688, filed Dec. 17, 2002 (the '688 application), which is hereby incorporated by reference in its entirety. Eliminating the need for a tilting platform, the diverter traps disclosed in the '688 application advantageously substitute at least two fixed barriers or diverter members that are positioned between the opening of the trap and a pair of spaced charge plates electrically connected to a voltage source. The two charge plates are configured such that contact with both charge plates simultaneously by a target animal will actuate the electric charge to effectively kill the animal.

However, a problem still exists in that, while the trap may have been triggered by an animal so as to initiate the kill cycle and subsequent entry into a standby mode requiring service to reset the trap, the animal subjected to the voltage may not have been killed and may have escaped. As a result, wasted effort is expended by exterminator personnel or other users in servicing and resetting a trap which, in fact, is already empty.

Therefore, a need exists for a trap that combines an electronic circuit for effective pest electrocution with a detection mechanism to rearm the trap without human intervention in the event of pest escape.

SUMMARY OF THE INVENTION

In view of the foregoing, one object of the present invention is to overcome the difficulties due to false-positive indications from an electronically controlled animal trap.

Another object of the present invention is to provide an electronically controlled animal trap that is able to detect the absence of an animal and thereafter to rearm itself multiple times without requiring human intervention.

A further object of the present invention is to provide an electronically controlled animal trap with reduced servicing requirements through automatic rearming in the event of animal escape.

In accordance with-this and other objects, the present invention is directed to a rearming, high-voltage, electronic animal trap for killing and retaining target animals, typically rodents such as mice. The trap includes a micro-controller chip with a high voltage circuit for generating and delivering a high-voltage pulse train to a pair of killing plates. With the circuit in an armed state, a killing cycle is triggered when a known impedance is sensed across the killing plates. If, upon conclusion of the killing cycle, the impedance remains across the plates, the circuit activates a visual indicator to alert a user that the trap contains a dead mouse. If, on the other hand, the impedance increases to that of an open circuit, likely meaning the animal has escaped, the circuit automatically rearms itself and no visual indicator is initiated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The combination of elements, arrangement of parts and features of construction that lead to the inventive rearming animal trap of the instant invention will be pointed out in more detail hereinafter with respect to the accompanying drawings in which like parts are designated by like reference characters throughout the several views of the drawings, wherein.

DESCRIPTION OF THE INVENTION

Figure 1:
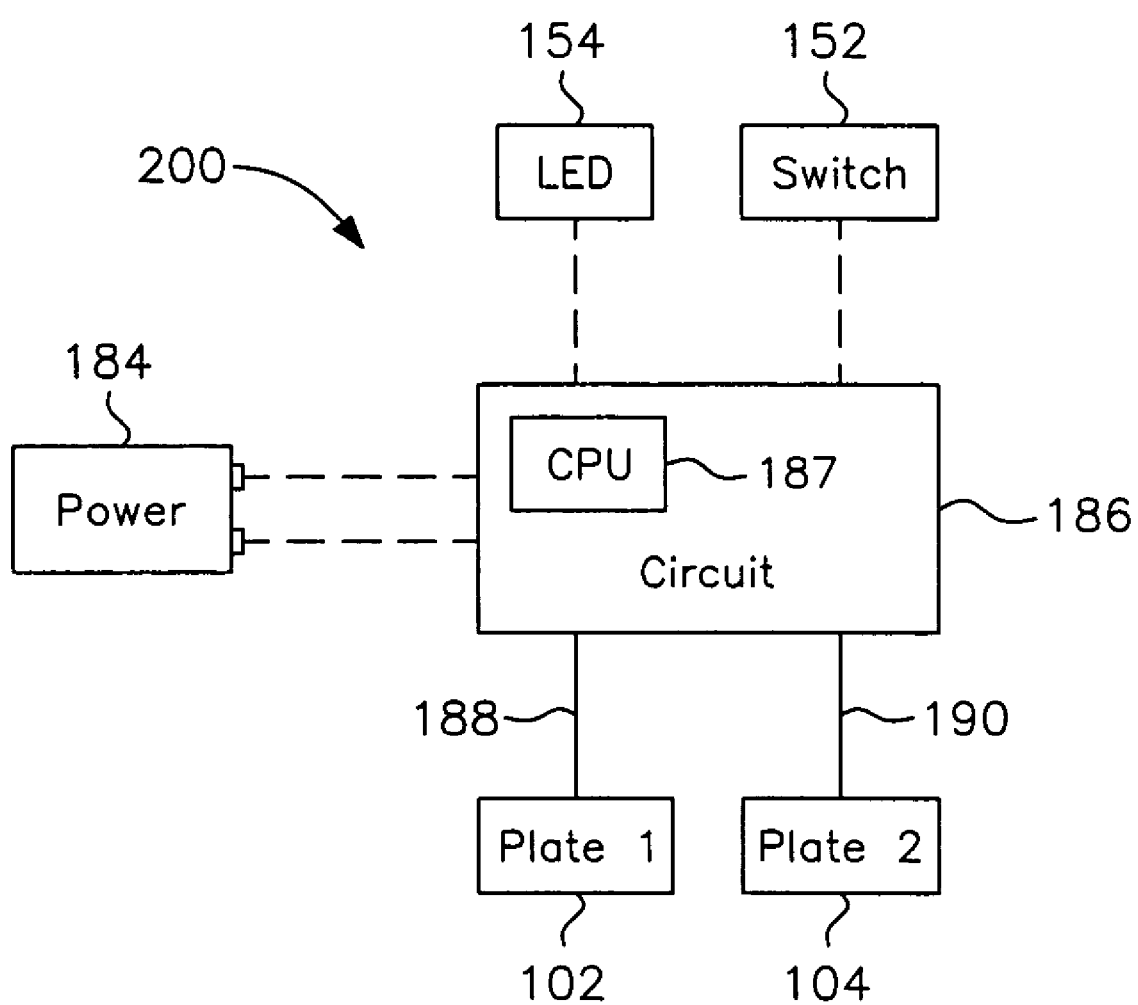
FIG. 1 a block diagram of the high-voltage, rearming circuitry according to the present invention.

Although only a few preferred embodiments of the invention are explained in detail, it is to be understood that other embodiments are possible and likely. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

Although the concepts of the instant invention are equally applicable to traps for animals of any size, devices of this type are primarily utilized in connection with the trapping of rodents such as mice and rats and, therefore, further discussion herein will be primarily directed to this application. The present invention is also of particular utility in the extermination of large insects.

FIG. 1 is a block diagram of the rearming circuit components, generally designated by the reference numeral 200, according to the present invention. The circuit components 200 includes a high-voltage output circuit 186 controlled by a central processing unit (CPU) 187 and electrically connected to a power supply 184. The CPU 187 may be embodied as a standard 8-bit micro controller chip, and the high output circuit 186 can be a standard fly-back circuit.

A first electrical connection member 188, which may be embodied as a wire, receives current from the high-voltage output circuit 186 and also connects to a first plate 102 so that electricity can be provided thereto. A second electrical connection member 190, which may also be a wire, connects the high-voltage output circuit 186 to a second plate 104. The circuit is activated by a switch 152 accessible from the exterior of the trap and adjacent an LED 154 which provides the user with visual indicators of trap operating status.

Before describing the structure and operation of the rearming circuit components 200 of the present invention in detail, representative trap embodiments within which the circuitry may be incorporated will be briefly explained in order to provide the necessary backdrop for a full understanding of the present invention.

Figure 2:
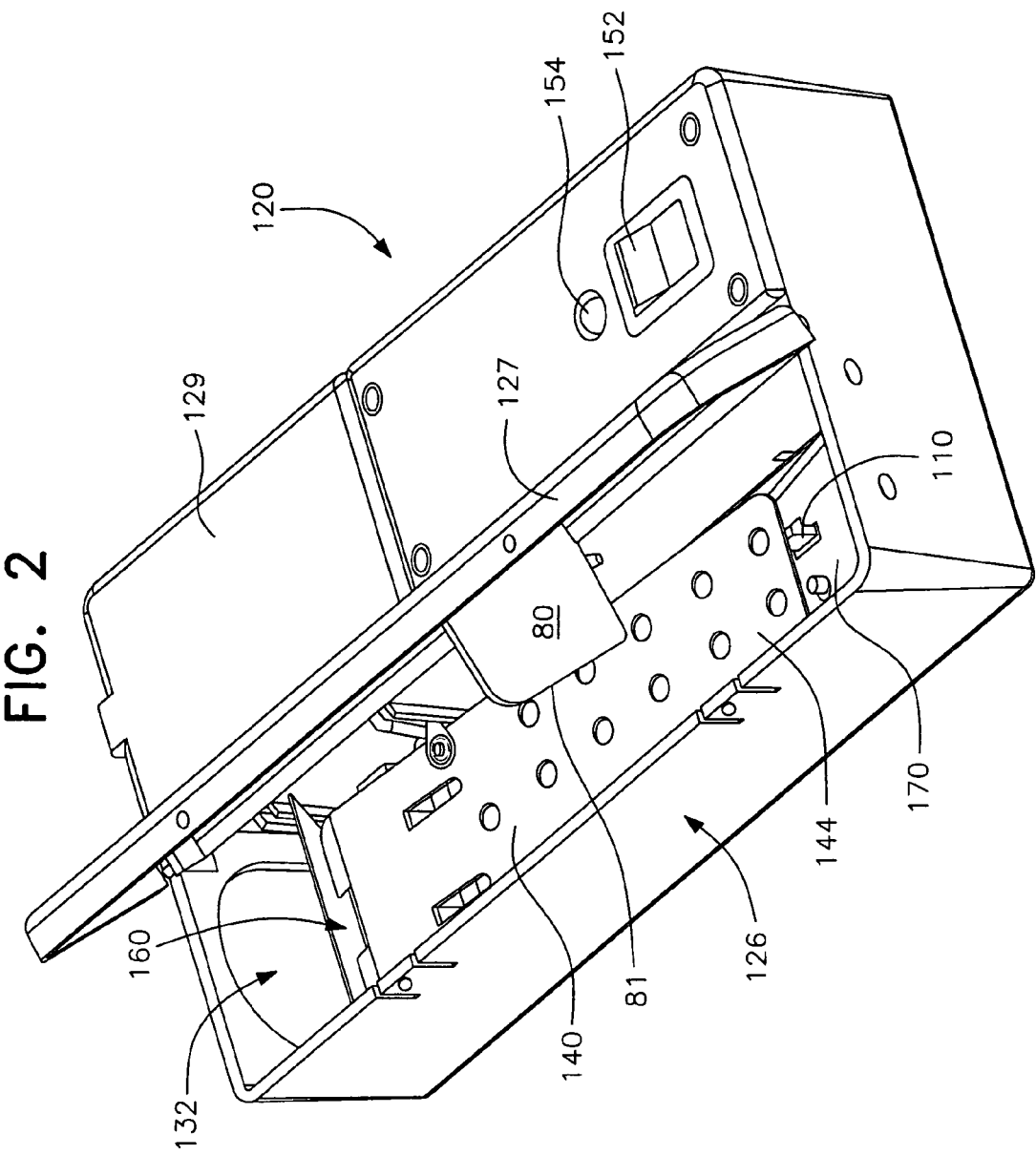
FIG. 2 is a perspective view of an embodiment of an electronic animal trap that may be used with the high-voltage rearming circuitry according to the present invention.
Figure 3:
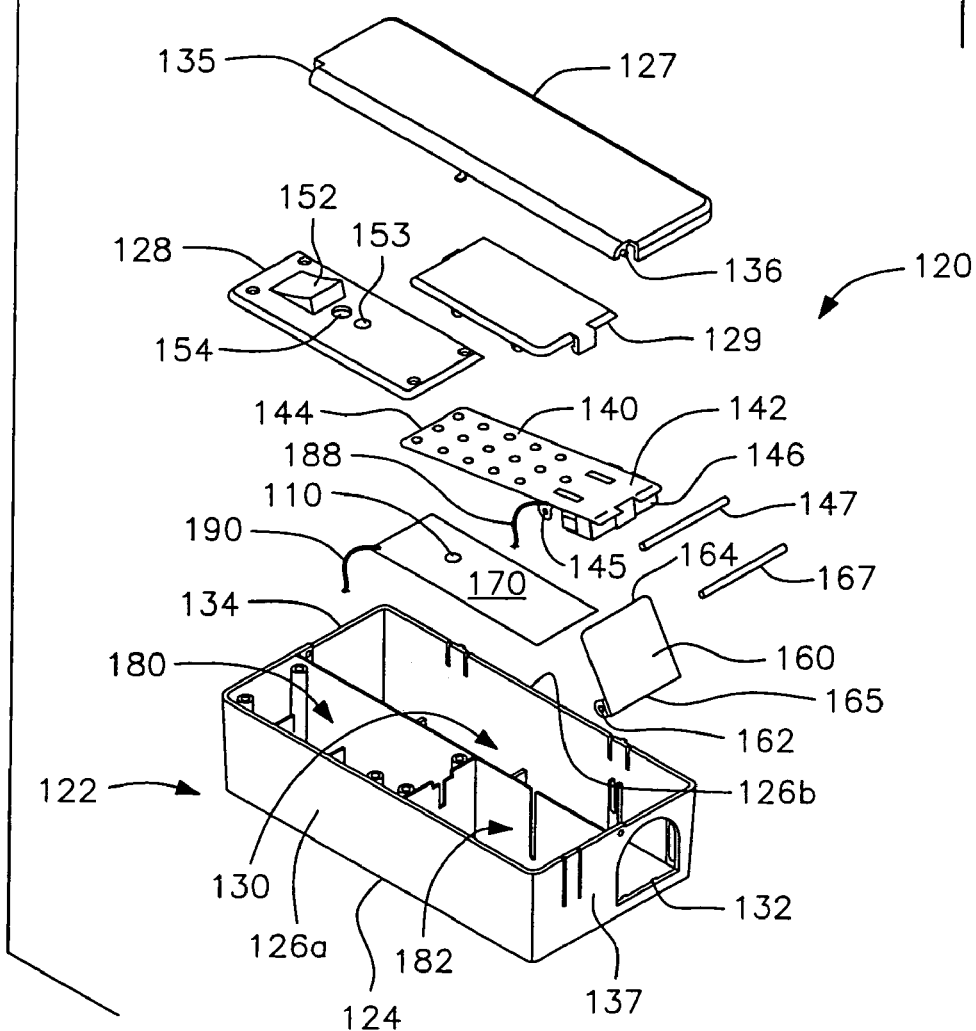
FIG. 3 is an exploded perspective view of the animal trap embodiment of FIG. 2.

FIGS. 2 and 3 depict perspective and exploded views, respectively, of an electronic animal trap, generally designated by the reference numeral 120, which is suitable for use with the high-voltage, rearming circuitry of the present invention. Such a trap is fully described in the copending '161 application, previously incorporated by reference.

As shown, the housing 122 has a bottom wall 124, upstanding peripheral walls 126, and a roof 127 with a cover 128 carrying the switch 152 or button that toggles from an "on" or standby position to an "off" or reset position. The trap 120 is activated by way of the switch 152.

The LED 154 is mounted on the cover 128 to provide visual indications of the activity and status of the trap. The LED 154 turns "on" or flashes to provide a visual indication to the user during activation of the trap and thereafter when the trap contains a dead mouse as will be more fully described hereinafter. A second LED 153, as well as others, may also be included should separate indicators of differing colors be desired.

The cover 128 extends over an electronics area, generally designated by the reference numeral 180, with a battery lid 129 covering an area 182 which contains the power supply 184. Of course, the assembly may be simplified by using a single roof such as is disclosed in the '688 application, previously incorporated by reference herein.

Figure 4:
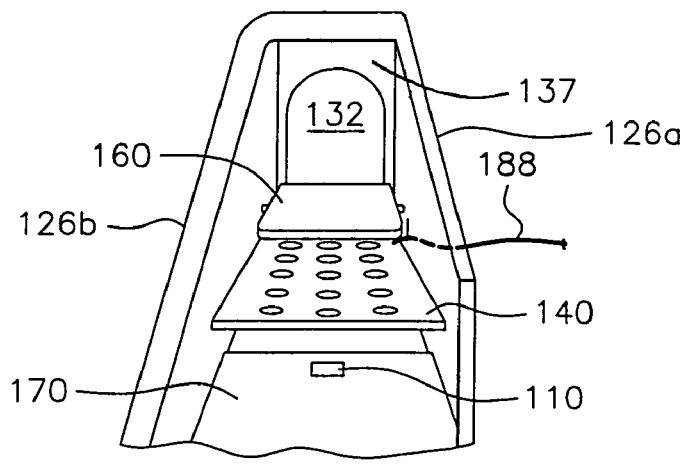
FIG. 4 is a fragmentary perspective view from the back wall into the trap assembly of the electronic animal trap of FIG. 2.

The high-voltage output circuitry of the present invention may be incorporated within any of the embodiments shown in the '688 application, as well as in the '161 application, and the present application is intended to cover all such embodiments. However, the representative trap embodiment of the '161 application as shown in FIGS. 2–4 is more explicitly set forth herein for the purposes of increased clarity in describing the present invention.

With reference to FIGS. 2 and 3, the bottom wall or base 124, peripheral walls 126 including back wall 134 and front wall 137, and roof 127 together define an enclosure for holding the targeted animal. The peripheral walls 126 include a first side 126a and a parallel second side 126b defining the elongated passageway 130. An entrance opening 132 at one end of the passageway 130 communicates with the exterior of the housing through an aperture in the front wall 137. Portions of the housing are movable between a closed position in which the captured animal is retained within the enclosure, and an opened position in which access is provided to the enclosure to remove the electrocuted animal therefrom. For example, the roof 127 may pivotally rotate about hinges 135, 136 to open the trap for disposal of the carcass.

The trap assembly further includes a floor member 140 extending along the passageway 130 intermediate the sides 126a, 126b. The floor member 140 has a first end portion 142 juxtaposed to the front wall 137 with entrance opening 132, and an opposite second end portion 144 juxtaposed to the back wall 134. A pivot element 145 underlies and supports the floor member 140 intermediate its end portions for tilting movement of the floor member 140 between a first position in which the first end portion 142 is lowered and the second end portion 144 is raised, and a second position in which the first end portion 142 is raised and carbon steel wire 147 extends through pivot 145 for permitting the floor member 140 to rotate or, more specifically, to perform a teeter-totter motion.

A door member 160 has a bottom edge portion 165 and a top edge 164 with a hinge element 162 secured to the bottom edge portion 165 adjacent to the entrance opening 132 for pivotal movement of the door member 160 between a lowered position in which the door member 160 rests on the first end portion 142 when the floor member 140 is in its first position to provide access to the passageway 130 by a targeted animal through the entrance opening 132, and a raised position where the door member 160 blocks the entrance opening. A door galvanized pin or carbon steel wire 167 extends through hinge element 162 for permitting door member 160 to rotate.

The door member 160 is biased toward its lowered position because the top edge 164 engages the roof 127 before it reaches its vertical position. The weight 146 mounted on the floor member 140 on the first end portion 142 thereof when the door member is in its lowered position maintains the floor member 140 in its first position, and the weight of an animal on the floor member 140 tilts the floor member 140 to its second position when the animal 150 passes from the entrance opening 132 beyond the pivot element 145 to thereby lift the door member 160 to its raised position.

The power supply 184 which provides power to the trap can include one or more batteries, such as two AA batteries. Alternatively, the trap may be electrically connected to a wall outlet. When embodied as a battery, the power supply 184 may be conveniently located in the power supply area 182. The battery cover 129 is preferably snap fitted for easy entry to the area 182 to replace expired batteries.

A bottom plate 170 is positioned near the back wall 134 and extends parallel to the bottom wall 124. An insulator 110 on the bottom plate 170 underlies the second end portion 144 of the floor member 140 when the floor member 140 is moved from its first position to its second position so that the target animal is only shocked when its rear paws are on the floor member 140 and its front paws are on the bottom plate 170, as will be more specifically described hereinafter.

The high-voltage output circuit 186 is electrically connected to the power supply 184 to convert the power to electricity. The first electrical connection member 188 receives the electricity from the high-voltage output circuit 186 and also connects to the floor member 140 so that electricity can be provided thereto. The second electrical connection member 190 connects to the bottom plate 170 near the back wall 134 to provide electricity to the bottom plate 170.

The weight of the animal 150 on the floor member 140 tilts the floor member to its second position. When the animal 150 passes from the entrance opening 132, beyond the pivot element 145, its weight lifts the door member 160 to the raised position and blocks the animal 150 from leaving the trap.

At this point, the bottom plate 170 and the floor member 140 are immediately adjacent one another, but kept in spaced relationship by the insulator 110. The advancing mouse, however, by placing its front paws on the bottom plate 170 while its rear paws are still on the floor member 140, completes the electrical circuit, allowing an electric current to flow between the bottom plate 170 and the floor member 140 to electrocute the mouse.

As shown in FIG. 2, the cover may include a downwardly depending plate 80 interposed between the second end portion 144 of the floor member 140 and the bottom plate 170, forcing the target animal to squeeze under the lower-edge 81 in its attempt to get to the bait. In doing so, it must then step on the bottom plate 170 and, for all intents and purposes, is precluded by its own body from pulling back before the circuitry is closed, resulting in electrocution.

Figure 5:
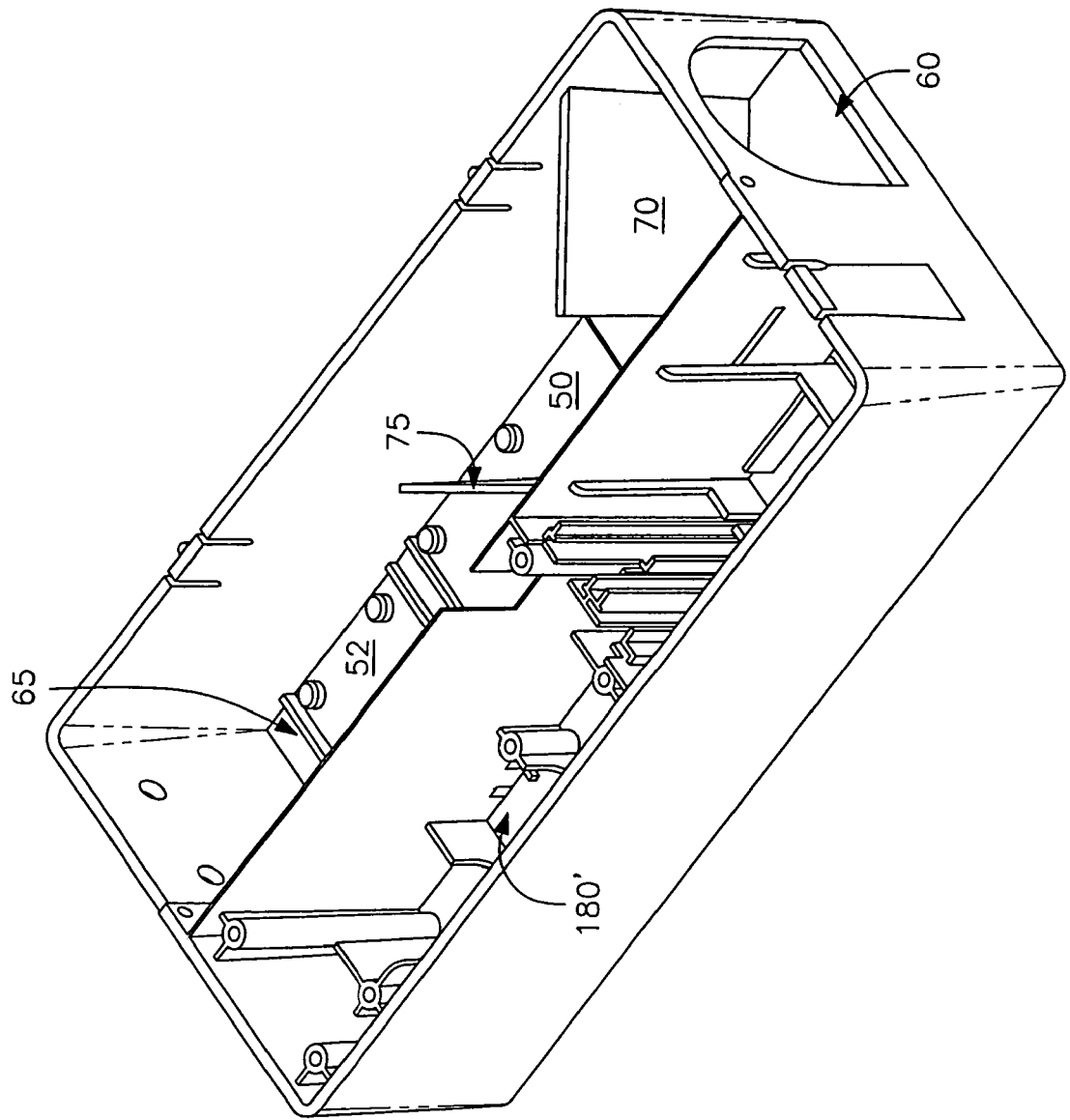
FIG. 5 is a perspective view of an alternative embodiment of an electronic animal trap that may be used with the high-voltage rearming circuitry according to the present invention.
Figure 6:
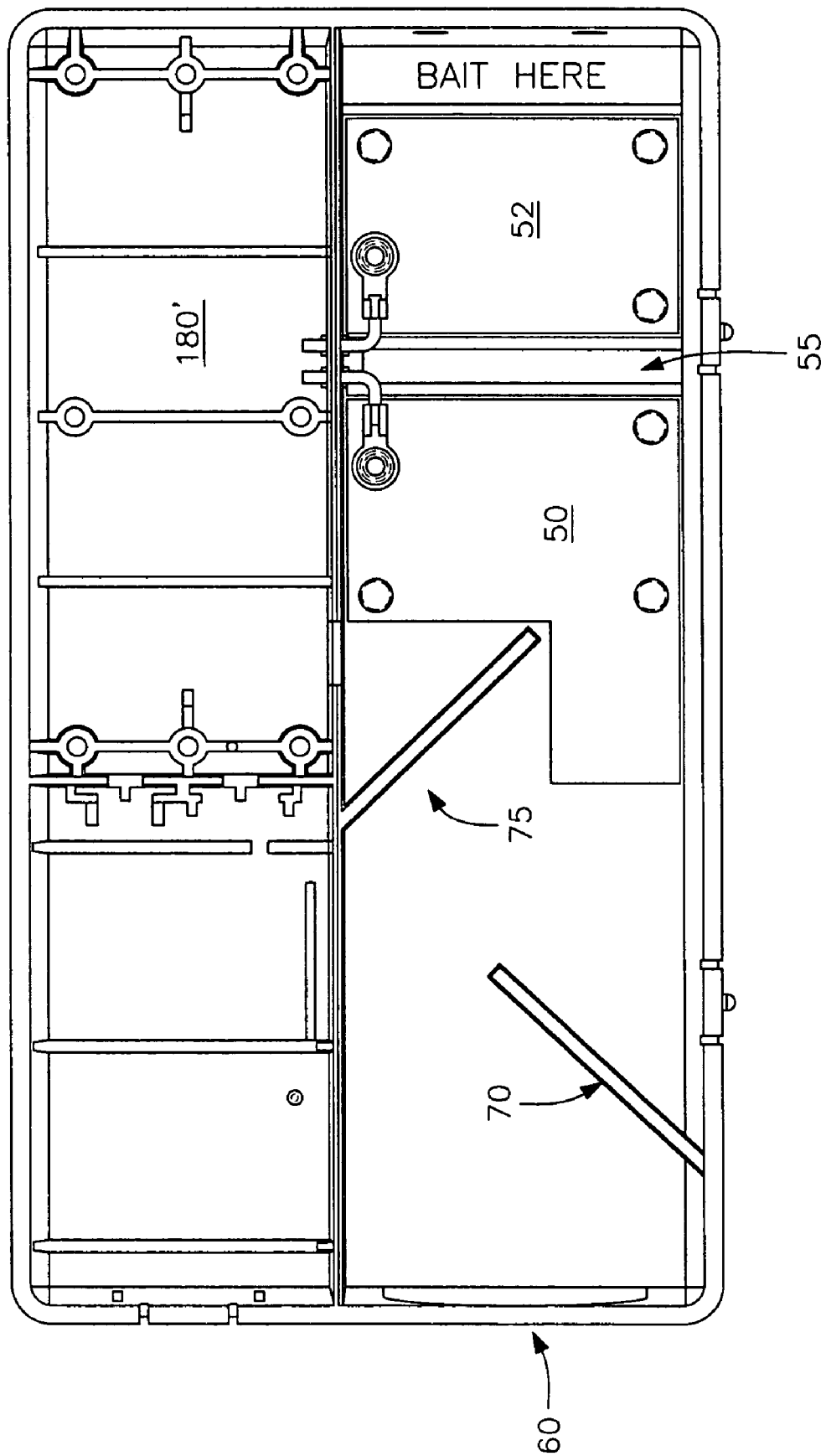
FIG. 6 is a top view of the animal trap embodiment of FIG. 5.

A further representative embodiment of an electronic trap suitable for use with the circuitry of the present invention is the diverter trap illustrated in FIGS. 5 and 6 and fully disclosed in the '688 application. As shown, in place of the tilting platform of the '161 application, this embodiment of the '688 application substitutes at least two fixed barriers or diverter members 70, 75 positioned between the opening 60 and the "killing chamber" 55. Two spaced charge plates or electrodes 50, 52 are located in the killing chamber 55 and electrically connected to the electronic circuitry in the electronics area 180'. As with the floor and bottom members of the tilting platform of the '161 application previously described in connection with FIGS. 2–4, the two charge plates 50, 52 in FIGS. 5 and 6 are configured such that contact with both charge plates simultaneously by a target animal will actuate the electric charge to effectively kill the animal.

The operation of the high-voltage, rearming circuitry of the present invention in conjunction with traps of the foregoing types will now be described with reference to FIG. 7, which illustrates a flow chart of the electrical circuit according to the present invention; FIG. 8 which illustrates the same circuit in schematic form.

To commence operation of the trap, power is applied to the high-voltage output circuit 186, either from a battery 184 or an electrical outlet, and the lid is closed. The unit is turned on, step 300, by a user using the switch 152, thereby placing the trap into an enabled condition. Upon entry into the enabled condition, the LED 154 flashes green once, step 302, and then turns off. The high-voltage output circuit 186 detects the battery status and, if the battery power is low, step 304, the LED flashes red one or more times, step 306, as a visual indicator to the user that the batteries should be replaced. Upon conclusion of the red LED flashing procedure, and also if the battery power is found to be sufficient in step 304, the unit remains in the enabled condition in a standby mode, step 308.

As an alternative indicator in the event of low battery power, the LED may flash red on a continuing and regular basis. If the trap includes only one LED, then green flashing thereof concurrent with the red flashing will change the output color of the LED to indicate to the user that both conditions are being reported. The red and green colors are provided by diodes 15 of appropriate colors within the circuit 186 as shown in FIG. 8.

The circuit 200 is automatically triggered or activated, step 310, when a known impedance is sensed across the killing plates 102, 104. According to a preferred embodiment, the impedance resulting in activation of the circuit is 10 k ohm to 1 M ohm as a resistance level representative of a mouse or large insect. Depending upon the resistors used to construct the circuit 186, other resistance levels could, of course, be implemented to suit the intended target animal or insect. With a trigger resistance of less than 10 k ohm, the circuit may still be activated but the output voltage is reduced.

Once activated, the circuit 186 delivers a high voltage pulse train to the killing plates 102, 104. These high voltage pulses are preferably delivered as spikes of approximately 4000V occurring every 4.25 ms over a 20-second killing cycle, step 312. The peak to peak current passing through a 1 M ohm trigger resistor when the circuit is activated is about 4 mA, and the load current is, about 160 mA.

Upon completion of the killing cycle, current to the plates is terminated, and the battery level is checked, step 314. As before, if the battery power is low, step 314, the LED flashes red one or more times, step 316, as a visual indicator to the user that the batteries should be replaced. Upon conclusion of the red LED flashing procedure, and also if the battery power is found to be sufficient in step 314, the unit checks a stored trigger count, step 318, to determine if the circuit has been activated three times since entering the standby mode at step 308. In the standby mode, the static voltage (open circuit) level across the plates is approximately 6V DC.

If the trigger count is equal to three, flashing of the green LED at a regular interval is initiated, step 320, and the unit does not reenter the enabled condition. Particularly, the LED flashes green once, checks to see whether 24 hours have elapsed, step 322 and, if 24 hours have not elapsed, repeats the flash and check cycle, steps 320 and 322. According to a preferred embodiment, the LED flashes green once every 5 seconds. When 24 hours have elapsed following the initiation of step 320, the unit is turned off, step 324.

If the trigger count is less than three, the unit checks for the continued existence of the target impedance across the plates, step 326, which indicates the continued presence of the mouse. If such resistance is still detected after about 15 seconds, the unit initiates the regular flashing and checking cycle, steps 320, 322, to visually notify the user that the trap contains an electrocuted animal. The green flashing of the LED continues until the user services the trap or for a 24 period, step 322, whichever occurs first, after which the unit is turned off.

If there is no trigger resistance, step 326, i.e., an open circuit (static voltage) is sensed between the killing plates upon completion of the killing cycle, the unit rearms to the enabled condition in standby mode, step 308, and thereafter awaits another mouse trigger. In this case, the LED does not illuminate, precluding the user from responding to a false-positive condition.

Figure 7:
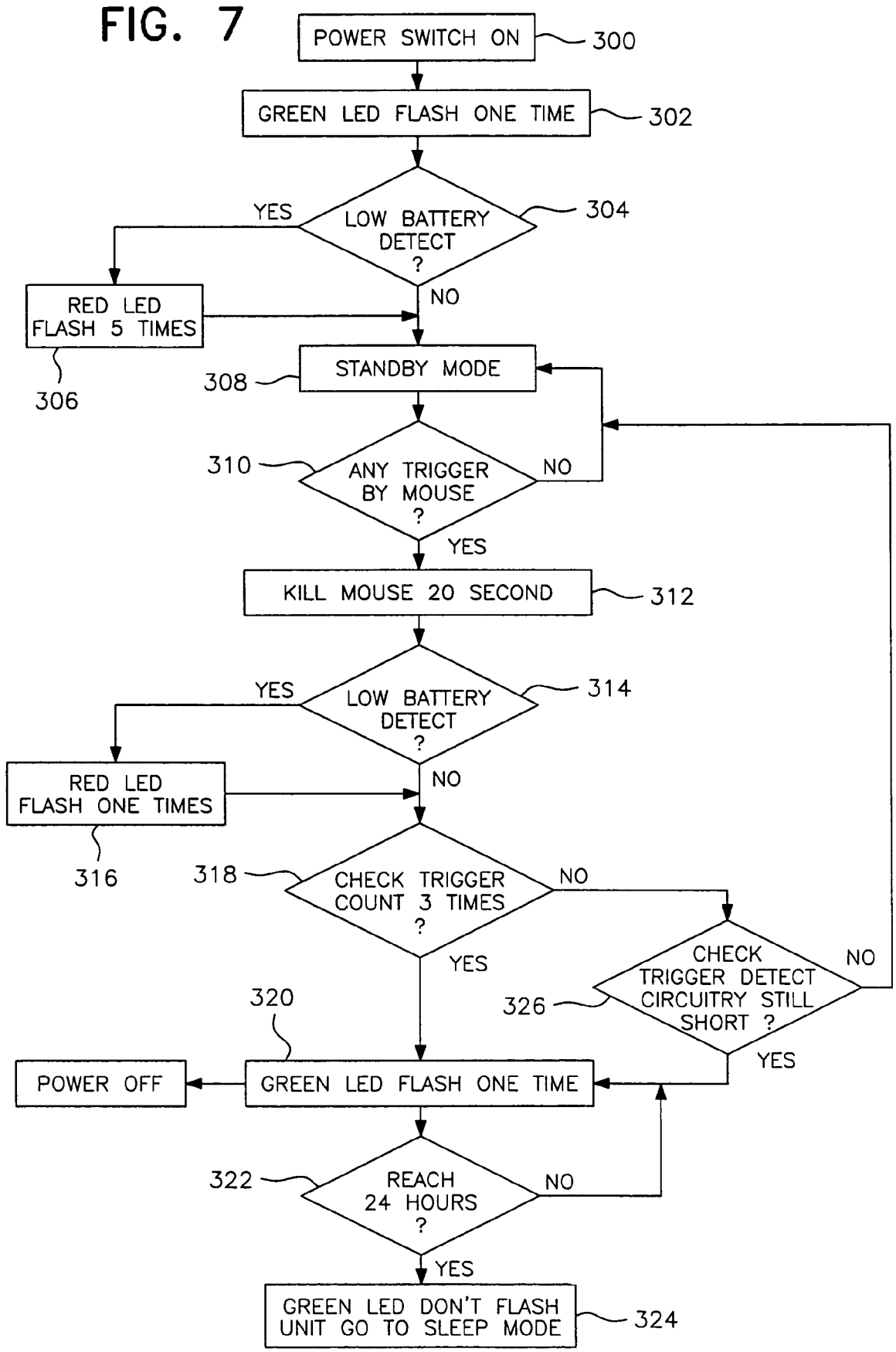
FIG. 7 is a flow chart of the high-voltage rearming electronic circuit according to the present invention.
Figure 8:
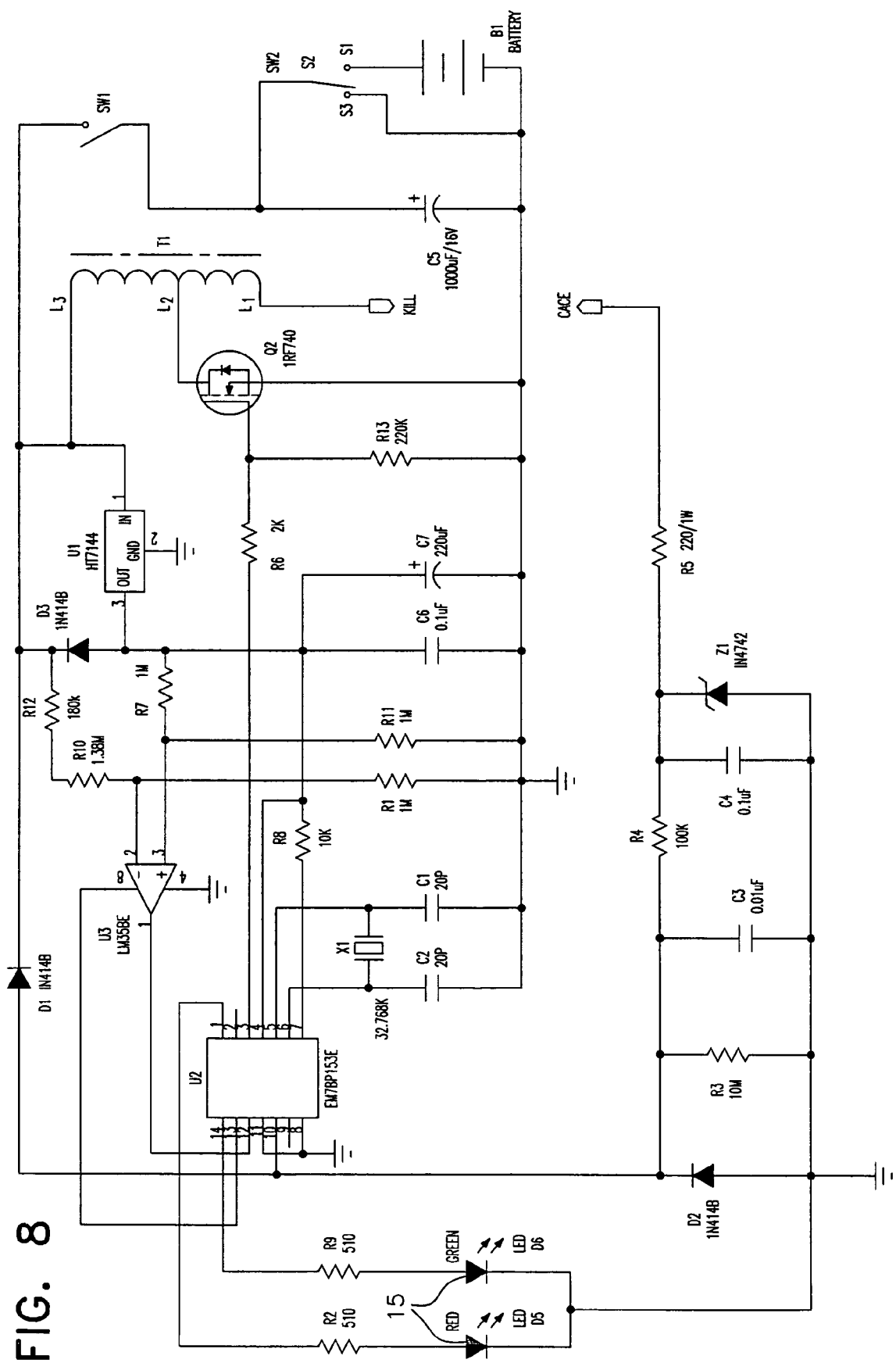
FIG. 8 is a schematic illustration of the high-voltage rearming electronic circuit of the present invention.

According to the preferred embodiment as illustrated in FIG. 7, in the event that the presence of the mouse is not detected following the killing cycle, the circuit will rearm itself twice in the manner just described, preferably within five seconds of completing the killing cycle. Once the unit has been triggered three times, step 318, the flashing and rechecking cycle is entered, steps 320, 322, regardless of load impedance on the killing plates, followed by unit shut-down after 24 hours. As would be apparent to persons of skill in the art, the circuit may be designed to rearm a greater or fewer number of times before turning off, depending upon system and user requirements.

The foregoing is considered as illustrative only of the principles of the invention. Since numerous modifications and changes will readily occur to those skilled in the art, it is not desired to limit the invention to the exact construction and operation shown and described and, accordingly, all suitable modifications and equivalents may be resorted to, falling within the scope of the invention.

We claim:

1. An electronic pest trap comprising:
    a trap body having a power source and a switch mechanism for placing said trap into an active standby mode;
    a pair of spaced killing plates positioned within said trap body; and
    a high-voltage automatic rearming circuit coupled to said pair of spaced killing plates, said circuit, with said trap in said active standby mode, automatically activating in response to a positive load input across the pair of killing plates such that said power source delivers a high-voltage pulse train to said killing plates for a time period corresponding to a killing cycle after which current flow to said killing plates is terminated;
    said circuit automatically rearming in response to a negative load input from said killing plates after said killing cycle; and
    said circuit initiating, in response to continued receipt of said positive load input across said killing plates, a visual notification mode indicating a requirement for manual service of said trap.

2. The electronic pest trap as set forth in claim 1, wherein said killing cycle includes delivering a pulse train to said killing plates of approximately 4000V every 4.5 msec for about 20 seconds.

3. The electronic pest trap as set forth in claim 1, wherein said circuit verifies battery power level and initiates a visual indicator in response to a low battery power level.

4. The electronic pest trap as set forth in claim 3, wherein said visual indicator for low battery power level includes a red LED.

5. The electronic pest trap as set forth in claim 1, wherein said visual notification mode includes activation of a green LED to flash intermittently.

6. The electronic pest trap as set forth in claim 5, wherein said circuit further includes a timer for determining a duration of said visual notification mode.

7. A method for exterminating a pest using an electronic pest trap having a high-voltage rearming circuit with a pair of spaced killing plates, comprising the steps of:
    a) placing the trap into an active standby mode in which said circuit is open due to the spaced killing plates;
    b) automatically activating said circuit when a pest contacts the pair of spaced killing plates to close said circuit;
    c) delivering, by said circuit, a high-voltage pulse train to said killing plates for a time period corresponding to a killing cycle;
    d) terminating current flow to said killing plates upon completion of said killing cycle; and
    e) initiating, in response to continued contact of said pest across said killing plates, a visual notification mode indicating a requirement for manual service of said trap and disabling subsequent killing cycle initiation or, in an absence of continued contact of said pest across said killing plates, rearming the trap to said active standby mode as provided in step a).

8. The method as set forth in claim 7, further comprising, after step d), the step of verifying battery power level and initiating a visual indicator in response to a low battery power level.

9. The method as set forth in claim 7, wherein step c) includes delivering a pulse train to said killing plates of approximately 4000V every 4.25 msec for about 20 seconds.

10. The method as set forth in claim 7, wherein said visual notification mode includes the steps of:

initiating a timer;

activating flash illumination of an LED associated with said trap;

comparing a value kept by said timer to a threshold time period; and repeating the steps of activating and comparing until said timer value meets said threshold time period and then placing said trap into an inactive sleep mode.

11. The method as set forth in claim 10, wherein said threshold time period is 24 hours.

* * * * *